US006981475B2

(12) United States Patent
Turquis

(10) Patent No.: US 6,981,475 B2
(45) Date of Patent: Jan. 3, 2006

(54) PROCESS FOR CONTROLLING THE VALVES OF AN INTERNAL COMBUSTION ENGINE

(75) Inventor: M. Pascal Turquis, Epinay sur Seine (FR)

(73) Assignee: Peugeot Citroen Automobiles SA, Velizy-Villacoublay Cedex (FR)

( * ) Notice: Subject to any disclaimer, the term of this patent is extended or adjusted under 35 U.S.C. 154(b) by 0 days.

(21) Appl. No.: 10/799,315

(22) Filed: Mar. 12, 2004

(65) Prior Publication Data

US 2004/0250780 A1 Dec. 16, 2004

(30) Foreign Application Priority Data

Mar. 12, 2003 (FR) .................................. 03 03048

(51) Int. Cl.
*F01L 1/34* (2006.01)

(52) U.S. Cl. ............. 123/90.15; 123/432; 123/184.43; 123/184.53

(58) Field of Classification Search ............. 123/90.11, 123/90.15–90.18, 52.3, 65 P, 184.21, 184.31, 123/184.43, 184.45, 184.53, 216, 306, 308, 123/432
See application file for complete search history.

(56) References Cited

U.S. PATENT DOCUMENTS

| | | | | | |
|---|---|---|---|---|---|
| 4,515,115 | A | * | 5/1985 | Okubo | 123/184.53 |
| 4,614,173 | A | * | 9/1986 | Okimoto et al. | 123/216 |
| 4,756,284 | A | * | 7/1988 | Okimoto et al. | 123/216 |
| 5,054,439 | A | * | 10/1991 | Akagi et al. | 123/184.43 |
| 5,056,486 | A | | 10/1991 | Johannes | |
| 5,211,146 | A | * | 5/1993 | Pischinger | 123/316 |
| 5,421,296 | A | * | 6/1995 | Hitomi et al. | 123/184.53 |

FOREIGN PATENT DOCUMENTS

| | | | |
|---|---|---|---|
| DE | 32 06 199 | A | 9/1983 |
| DE | 36 00 408 | A | 7/1987 |
| DE | 195 11 136 | A | 5/1996 |
| DE | 197 35 863 | A | 2/1999 |

OTHER PUBLICATIONS

French Preliminary Search Report, Nov. 14, 2003.

* cited by examiner

*Primary Examiner*—Thomas Denion
*Assistant Examiner*—Kyle M. Riddle
(74) *Attorney, Agent, or Firm*—RatnerPrestia

(57) ABSTRACT

The present invention pertains to a process and a system for controlling the intake valves of an internal combustion engine comprising at least two valves per cylinder. During the closing of the intake valves of a cylinder, provisions are made for closing a first valve and then for closing a second valve, the time between the closing of the first valve and the closing of the second valve being such that it permits the propagation toward the second valve of at least one overpressure generated in the first port by the closing of the first valve.

14 Claims, 4 Drawing Sheets

PROCESS FOR CONTROLLING THE VALVES OF AN INTERNAL COMBUSTION ENGINE

BACKGROUND

The present invention pertains to a process for controlling the valves of an internal combustion engine having at least two intake valves per cylinder. It also pertains to a system that permits the use of the process according to the present invention.

The present invention is applicable, in particular, to engines with 16 valves.

The reduction of the fuel combustion of vehicles is a major objective faced by the automobile industry.

One of the means of reducing the fuel consumption and/or significantly improving the pleasure of driving a vehicle equipped with an engine is to increase the torque of the engine at low engine speed in the range that is used predominantly by the driver. This improvement makes it possible, at equivalent performance, to increase the gear ratio of the vehicle and, by an effect induced by the modification of the operating point, to reduce the consumption of the vehicle.

The torque of an engine is linked directly with the amount of air that can be caused to enter the cylinders. The charge or the volumetric efficiency of an engine characterizes its capacity to admit air into its cylinders, assuming given conditions upstream (in terms of the pressure, temperature and humidity of the combustion air). For unsupercharged engines, the conditions upstream depend principally on the atmosphere.

The charge is defined as the ratio of the mass of air admitted into the cylinders during each cycle of the engine to the mass of the same volume of air (the displacement of the engine) under the conditions upstream.

The charge of an engine is not constant over the entire range of operation. Certain acoustic phenomena of the system formed by the air columns from the plenum of the intake distributor to the valves and the volume of air in the cylinders make it possible to improve this charge under certain operating conditions.

Under the resonance conditions of this system, it is possible to enclose in the cylinder a pressure that is higher than the atmospheric pressure and thus to take advantage of a natural supercharge. This phenomenon is called the Kadenacy effect and corresponds to the use of a Helmholtz tuning in analogy to a Helmholtz resonator or a mass-and-spring system. The high charge enables the engine to deliver a high torque under the operating conditions in which Helmholtz tuning occurs. The theoretical natural Helmholtz resonance frequency f is defined by the following formula:

$$f = \frac{c}{2p}\sqrt{\frac{S}{LV}}$$

in which c is the velocity of sound in the medium contained in the intake circuit, S is the mean cross section of the intake port (from the plenum of the intake distributor to the valves), L is the length of an intake port, and V is half the displacement plus the dead space of a cylinder.

Consequently, a single theoretical natural Helmholtz resonance frequency corresponds to a given geometry of the intake ports and a given displacement.

The theoretical Helmholtz tuning condition N is given by the formula:

$$N=30*f*\,l/180$$

in which:

f is the theoretical natural Helmholtz resonance frequency, l is the width of the law of intake, which is the number of degrees of the crankshaft angle during which the intake valves are lifted by more than 1 mm.

It is also possible to increase the air charge of an engine taking advantage of a so-called quarter-wave acoustic tuning in the system formed by the primary tubes of the intake distributor. During the closing of the intake valves, the abrupt stopping of the movement being introduced from the air column present in the primary tube associated with this valve generates an overpressure wave which propagates toward the inlet of the primary tube. This wave is then reflected, changing its sign (depression wave), because the end of the primary tube is open over a considerable volume: the "plenum" of the distributor. When the depression wave arrives at the closed valve, it is reflected without changing its sign. It again reaches the open end of the primary tubes and is then reflected as an overpressure wave.

By adjusting the opening angle of the intake valve, this overpressure wave can be utilized to increase the rate of flow of the air being introduced at the beginning of the intake and thus to improve the charge.

The velocity of propagation of the waves in the primary ports being conventionally designated by C0, the propagation time of a wave from one end to the other end of a primary tube having a length $l_1$ is: $t=l_1/C\mathbf{0}$. Considering the change in the sign of the wave at the time of its reflection in the plenum, the wave must perform an even number of back-and-forth movements in the same port to generate an overpressure at the valve. If the subsequent opening of the valve takes place at the end of a time that is a multiple of $4*l_1/C\mathbf{0}$, the acoustic wave will have a beneficial effect on the opening of the intake valve.

In practice, the optimization of these acoustic effects by dimensioning the intake system and the adjustment of the laws of opening of the intake valves make it, in general, possible to benefit from these effects in a limited operating range. It follows from this that if the charge and consequently the torque are to be increased at low engine speeds, it is, in general, necessary to modify the dimensions and the adjustment, and this modification is manifested in a degradation of the engine performance at high engine speeds.

In case of conventional four-stroke gasoline engines, the opening and the closing of the intake valves are usually performed by a mechanical system, which leads to a fixed ratio between the lift of the valves and the angle of rotation of the engine regardless of the operating conditions or the charge of the engine. These engines are called engines with fixed camshaft adjustment.

However, variable timing systems are currently being developed, especially for four-stroke gasoline engines.

Thus, several types of prior-art systems make it possible to partially solve the above-mentioned problem:

the systems with variable acoustics comprising a mechanical device that makes it possible to vary the length of the intake ports and thus to vary the operating range that benefits from an acoustic tuning;

the camshaft phase shifting systems (VVT or VTC) which make it possible to vary the adjustment of the valve lift diagram in relation to the angle of rotation reference of the engine without modifying the lift diagram. The variation of the adjustment may be discrete or continuous; and the systems with mechanical variable timing ("Valvetronic"), which make it possible to vary the moment of opening and the duration of opening identically for all intake valves.

These systems have the drawback of requiring arrangements or mechanical adjustments, which are not entirely satisfactory.

Consequently, the object of the present invention is to provide an easy-to-use system that makes it possible to notably improve the air charge of the cylinders of an internal combustion engine. It is particularly applicable in the gasoline-powered unsupercharged internal combustion engines equipped with variable timing systems that control the intake valves of each cylinder independently.

SUMMARY OF THE INVENTION

Consequently, the present invention pertains to a process for controlling the intake valves of an internal combustion engine comprising at least one first valve and at least one second valve per cylinder, each valve permitting a first and a second intake port of the cylinder to be closed and opened, respectively, and being controlled cyclically for opening and closing. The process provides for the following steps during the closing of the intake valves of a cylinder:

a first step of closing the first valve, then a second step of closing the second valve, the time T between the closing of the first valve and the closing of the second valve being such that it permits the propagation toward the second valve of at least one overpressure generated in the first port by the closing of the first valve.

Thus, contrary to the prior-art two-valve engines, provisions are made for a noticeable shift between the closing times of the valves.

The time T is at least equivalent to the time necessary for an acoustic wave to travel the path from the first valve to the second valve using the intake ports.

The value of this time T is approximately $$T=(k*4*L1+L2+L\text{int}+L2)/C0\pm\lambda L1/C0,$$

in which k is an integer, preferably ranging from 1 to 3,

L1 is the length of the first intake port,

L2 is the length of the second intake port,

Lint is the distance between the inlets of the two intake ports located opposite the valves, C0 is the velocity of sound in the medium contained in the ports, and λ is a number between 0 and 1 and preferably equals zero.

The closing of the first valve is actuated in the vicinity of the mid-course of the piston after the top dead center (TDC), and the openings of the intake valves are actuated at approximately the same moments. Moreover, the opening of the intake valves is preferably triggered approximately at the top dead center (TDC) of the operation of the engine.

The present invention also pertains to a system for controlling the intake valves of an internal combustion engine using the process according to the present invention. This system is applicable to an engine comprising at least one first valve and at least one second valve per cylinder, each valve being actuated cyclically by an actuating device to close or open a first intake port and a second intake port of the cylinder, respectively. A central control unit makes it possible to control the actuating devices in such a way as to control the closing of the first valve and then, a time T later, the closing of the second valve. This time T is at least equivalent to the time necessary for an acoustic wave to travel the path from the first valve to the second valve using the intake ports. This time T can have the following value:

$$T=(k*4*L1+L1+L\text{int}+L2)/C0\pm\lambda L1/C0,$$

in which k is an integer, preferably between 1 and 3,

L1 is the length of the first intake port,

L2 is the length of the second port,

Lint is the distance between the inlets of the two intake ports located opposite the valves, and C0 is the velocity of sound in the medium contained in the ports, and λ is a number between 0 and 1 and preferably equals 0.

According to one embodiment of the present invention, the central unit controls the closing of the first valve in the vicinity of the mid-course of the piston after the top dead center. Moreover, it controls the actuating devices in such a way as to achieve the opening of the valves approximately at the same moments. These openings occur approximately at the top dead center (TDC) of the operation of the engine.

According to one embodiment of the present invention, the actuating devices are electromagnetic actuating devices.

BRIEF DESCRIPTION OF THE DRAWINGS

The various objects and characteristics of the present invention will appear more clearly from the following description and the figures attached, in which.

DETAILED DESCRIPTION

A process for controlling the intake valves of an internal combustion engine according to the present invention will be described below.

The present invention will be described with respect to a gasoline-powered unsupercharged four-stroke internal combustion engine equipped with a variable timing system.

The fuel is injected into each cylinder or the intake ports via a pressurized fuel supply system. Moreover, the engine comprises at least two intake valves per cylinder. Finally, the air is distributed among the cylinders by an intake system, and each valve of each cylinder is supplied with air via an independent port terminating at least partly at the valve seat.

It should be noted that the fuel supply may be performed by one or another of the two ports.

The intake valve displacement controls of the same cylinder may also be performed independently from one another and they make possible the adjustment of the valve opening times and the duration of the opening.

Figure 1:
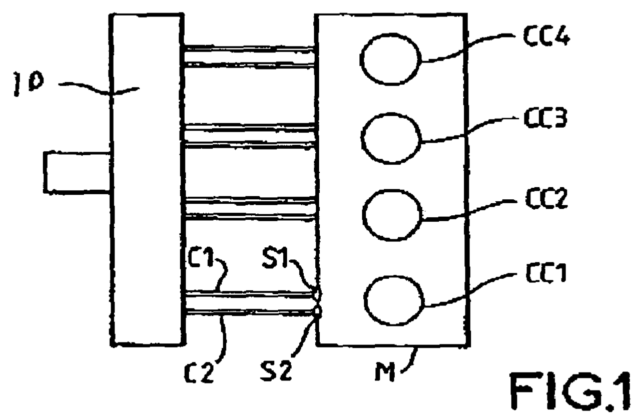
FIG. 1 shows a schematic diagram of an engine, which makes it possible to illustrate the explanation of the process according to the present invention.

FIG. 1 schematically shows an internal combustion engine to which the present invention is applied. This figure shows the engine M proper comprising four cylinders CC1, CC2, CC3 and CC4. Each cylinder is supplied with air via the intake ports such as C1 and C2 for the cylinder CC1. Each intake port is connected on one side to an intake distributor ID and on the other side to a cylinder of the engine that it supplies. Each intake port terminates, on the side of the cylinder, in a valve, such as S1 for the intake port C1 and S2 for the intake port C2, which makes it possible to supply the air into the cylinder, or not, depending on whether it is open or closed.

The control of the intake valves S1 and S2 of the cylinder CC1 and consequently the air supply of this cylinder will be described on the basis of FIG. 2.

To help understand the figures, the closed valves are shown in the figures as solid valves, while the open valves are represented as clear valves.

Figure 2:
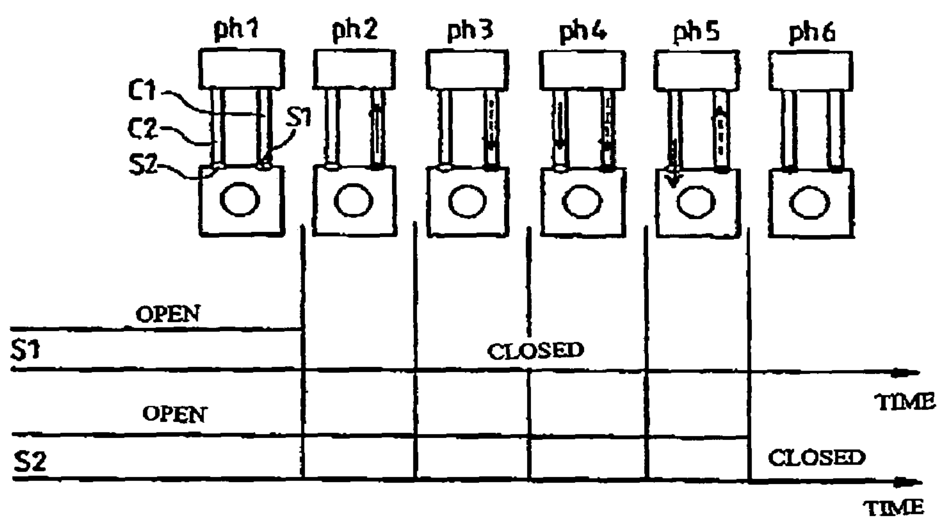
FIG. 2 shows a simplified flow chart of the operation of the process according to the present invention.

During a first phase designated by ph1, the two valves S1 and S2 are open, as is shown in the time diagram shown in the bottom part of FIG. 2.

In the course of phase ph2, or before this phase, the valve S1 is closed. A pressure wave is now generated upon the closing of this valve, and the higher the velocity of the gases admitted at the time of the closing, the higher is the overpressure generated. The overpressure consequently has its maximum when the valve is closed in the vicinity of the mid-course of the piston (90° after the top dead center).

The overpressure generated propagates in the port C1 in the direction opposite the normal supply, i.e., toward the intake distributor ID.

During phase ph3, the overpressure arrives at the end of the intake port C1, which is on the side of the intake distributor. This overpressure propagates partly in the intake distributor and consequently toward the intake port C2 of the valve S2, which intake port C2 is located in the immediate vicinity of the intake port C1, and it is partly reflected, changing its sign, in the intake port C1 toward the valve S1.

Consequently, a depression is generated during phase ph4 in the intake port C1; this depression is indicated by an arrow drawn in broken line and is directed toward the valve S1. An overpressure indicated by an arrow drawn in solid line, which is directed toward the valve S2, is generated in the intake port C2.

During phase ph5, the depression wave propagates in the intake port C1 and arrives at the valve S1, which is closed. This depression wave is now reflected in the intake port C1 in the opposite direction. During this time, the overpressure in the intake port C2 causes an additional inflow of air into the cylinder CC1 via the valve S2, which is open.

The valve S2 is closed at the end of phase ph5, as is indicated in the time diagram in the bottom part of FIG. 2.

Thus, we are now in phase ph6, when the two valves S1 and S2 are closed.

Figure 3:
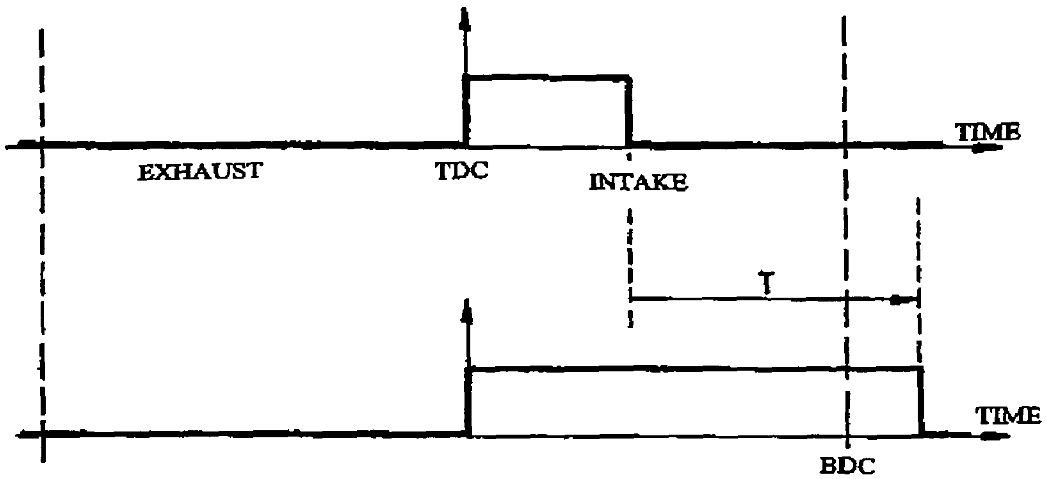
FIG. 3 shows different phases of the intake control of an engine according to the present invention.

FIG. 3 shows the control of the intake valves S1 and S2 within the framework of an operating cycle of an engine. The valves S1 and S2 are obviously closed during the exhaust phase. The valves S1 and S2 are open starting from the TDC (top dead center) during the intake phase. The intake valve S1 is then closed. As was indicated above, this closing is preferably performed approximately at the mid-course of the intake phase. The valve S2 is then closed after the BDC (bottom dead center) and at any rate after a time T permitting the overpressure wave generated by the closing of the valve S1 to reach the valve S2. In case of operation according to FIG. 2, the time T corresponds at least to the time it takes for the overpressure wave to travel through the intake port C1, to reach the inlet of the intake port C2 and to travel through the intake port C2. If C0 is the velocity of sound in the medium contained in the intake ports and in the intake distributor, this time T is consequently $$T=(L1+L\text{int}+L2)/C0.$$

Figure 4:
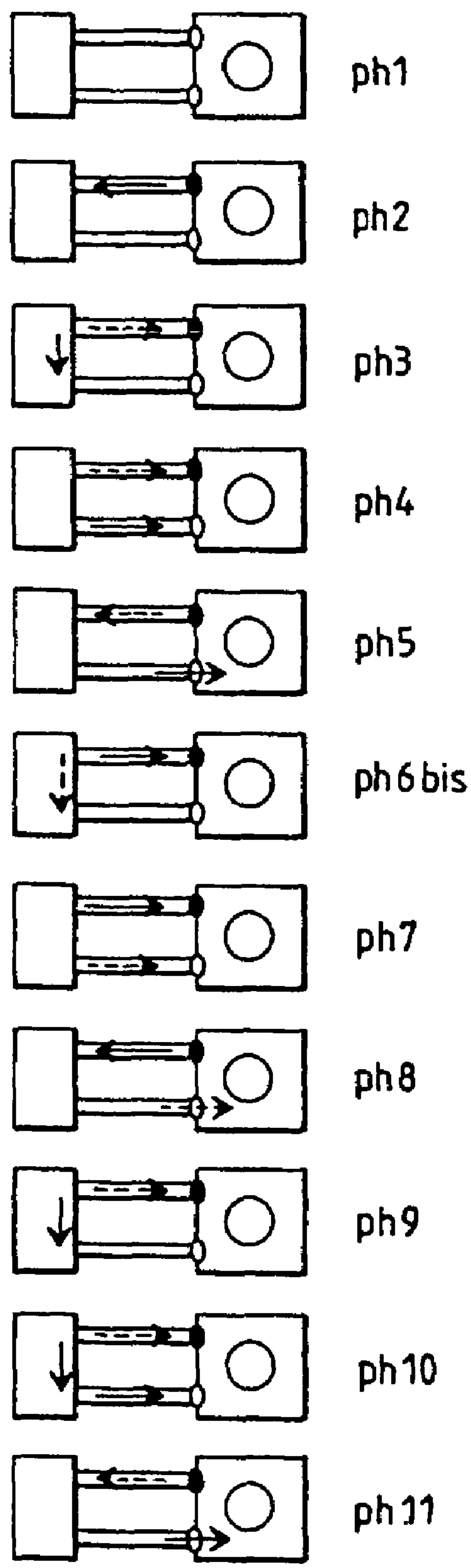
FIG. 4 shows a more detailed flow chart of the operation of the process according to the present invention.

Contrary to what was described in connection with FIG. 2, the waves perform, in general, more than one back and forth movement between the closing of the valve S1 and the closing of the valve S2. FIG. 4 shows, for example, such a process. The phases ph1 through ph5 according to FIG. 2 are seen in the process as well. By contrast, the valve S2 is not closed after phase ph5. The process continues in the course of the next phase, designated by ph6bis in FIG. 4, and in the course of the next phases. The depression wave reflected by the valve S1 (in the course of phase ph5) is transmitted partly in the intake distributor toward the intake port C2 and is reflected, changing its sign, toward the valve S1.

An overpressure is transmitted in the course of phase ph7 toward the valve S1 and a depression is transmitted toward valve S2.

During phase ph8, the overpressure wave is reflected without changing its sign at the valve S1, which is closed. The depression wave enters the cylinder via the seat of valve S2 and causes a temporary reduction of the air flow rate into the cylinder.

During phase ph9, the overpressure wave arriving from valve S1 propagates partly in the intake distributor toward the intake port C2 and another part of it is reflected, changing its sign, toward the valve S1.

A depression wave propagates under these conditions during phase ph10 in the intake port C1 toward the valve S1, and an overpressure wave propagates in the intake port C2 toward the valve S2.

The depression wave is reflected during phase ph11 at the closed valve S1 and the overpressure wave enters the cylinder via the seat of valve S2, causing an increase in the flow rate of air into the cylinder. Consequently, the situation is the same as during phase ph5 in FIG. 2.

It is thus understood that the process could continue further. However, the overpressure wave that enters the cylinder during phase ph11 will have traveled a course of a length of $$5L1+L\text{int}+L2$$

at this stage of operation.

A subsequent overpressure would travel over a path of a length of $$9L1+L\text{int}+L2.$$

Under these conditions, the time that must be provided between the closing of valve S1 and the closing of valve S2 must be approximately equal to $$T=(4kL1+L1+L\text{int}+L2)/C0,$$

in which k is an integer.

As far as the depression waves are concerned, it is seen that they arrive in the cylinder via the valve S2 at the end of a time of $$(4kL1+3L1+L\text{int}+L2)/C0$$

after the closing of the valve S1.

The time between an overpressure wave and a depression wave is consequently 2L1/C0. The beneficial zone in which the overpressure has its maximum in the cylinder is consequently around the maximum overpressure and has a duration of ±L1/C0 relative to this maximum.

Therefore, the valve S2 should be closed at a time of $$T2=(4kL1+L1+Lint+L2)/C0.$$

Figure 5:
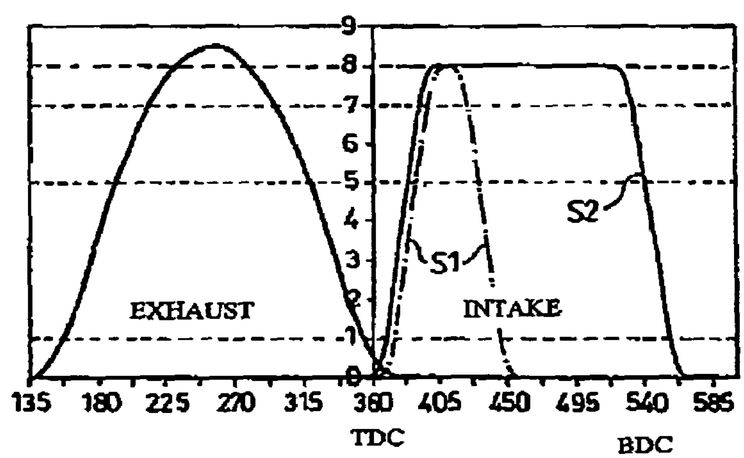
FIG. 5 shows the operating curves of an engine according to the present invention.

The diagram in FIG. 5 shows the operation of a cylinder of an engine controlled with the process according to the present invention. The ordinate in this diagram shows the valve lift in mm.

This type of diagram can be preferably used at low and medium engine speeds. Provisions are made for closing valve S1 at about the mid-course of the piston, for closing valve S2 after the intake BDC when the overpressure has entered the cylinder, for a time of (k*4*L1+L1+Lint+L2)/C0±λL1/C0 (λ being between 0 and 1) between the closing of the intake valve S1 and the closing of the intake valve S2 in order to benefit from the overpressure generated by the first closing.

Figure 7:
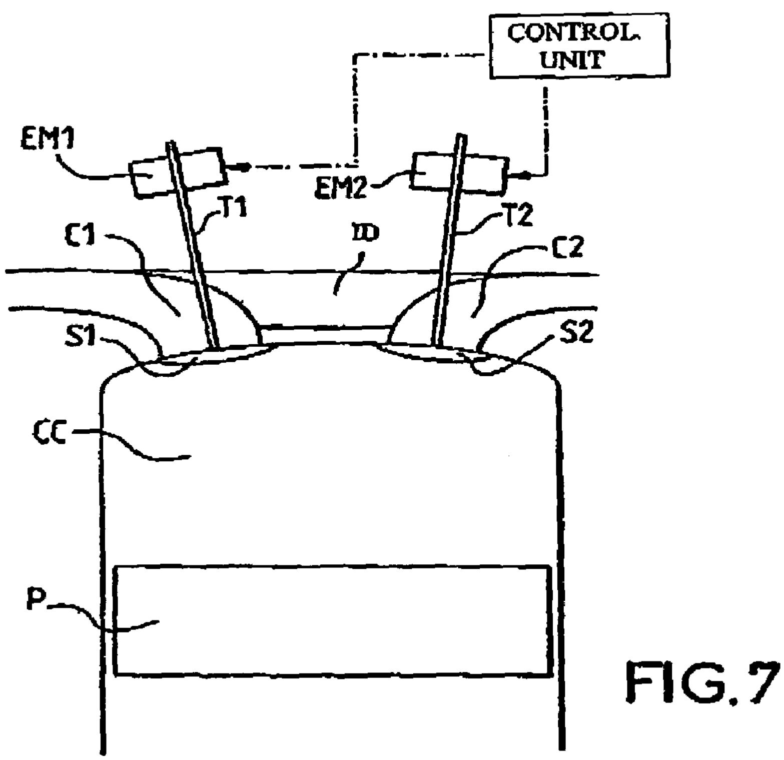
FIG. 7 shows an example of a system that makes it possible to use the process according to the present invention.

FIG. 7 shows a system that makes it possible to use the process according to the present invention.

This figure is a schematic diagram of an engine cylinder CC with its piston P and two intake valves S1 and S2. The exhaust valves are not shown in this figure.

The intake ports C1 and C2 terminate on the upper part of the cylinder and permit an intake distributor ID to be connected to the cylinder CC. The valves S1 and S2 make it possible to close these ports or permit the communication between the ports and the cylinder.

The valves S1 and S2 are integrally connected to the control rods T1 and T2. In the example according to FIG. 7, these rods are controlled by the electromagnetic or electromechanical actuating devices EM1 and EM2.

The electric power supply for the electromagnets of these actuating devices is controlled by a central control unit CU.

The central control unit CU consequently manages the operation of the valves. Depending on the position of the piston, the central control unit brings about the closing of the valve S1 after the piston has passed through the TDC (top dead center). As was described above, it then controls the closure of the valve S2 approximately at the end of a time $$T=(k*4*L1+L1+Lint+L2)/C0.$$

More precisely, a time of $$T=(k*4*L1+L1+Lint+L2)/C0\pm\lambda L1/C0$$

can be provided.

An electromagnetic or electromechanical valve control was considered in the exemplary embodiment just described. However, this control could also be of another type without going beyond the scope of the present invention. In particular, provisions could be made:

for a camshaft timing and an additional (hydraulic, electromagnetic, etc.) system permitting the opening and closing of the intake ports in the course of the intake phase;

for controlled intake valves, without camshafts, e.g., by an electrohydraulic mechanism or an electromechanical mechanism.

The operation according to the present invention was described above in reference to an engine of an internal combustion engine. It is clear that the operation applied to the other cylinders is the same. More precisely, provisions are made for all the valves S1 of the different cylinders, on the one hand, and all the valves S2, on the other hand, to operate at the same time.

It is consequently seen that the present invention pertains to an air intake strategy into the cylinders which makes it possible to extend the range of operation of an engine to the low engine speeds, where the gains in charge linked with the quarter-wave type tuning can be benefited from without changing the dimensions of the intake distributor, and consequently without degradation at high engine speeds.

The principle is to generate a pressure wave with one of the valves during the intake phase, which makes it possible to obtain an overpressure at the other valve, just before the closing of the latter valve.

Moreover, the system according to the present invention makes it possible to achieve better mixture preparation (homogenization of the air-gasoline mixture) by creating above all a symmetrical air movement in the two intake ports of the cylinder and then sharply changing the type of flow at the time of the closing of the first valve S1, thus generating a mixing of the gases admitted into the cylinder.

Figure 6:
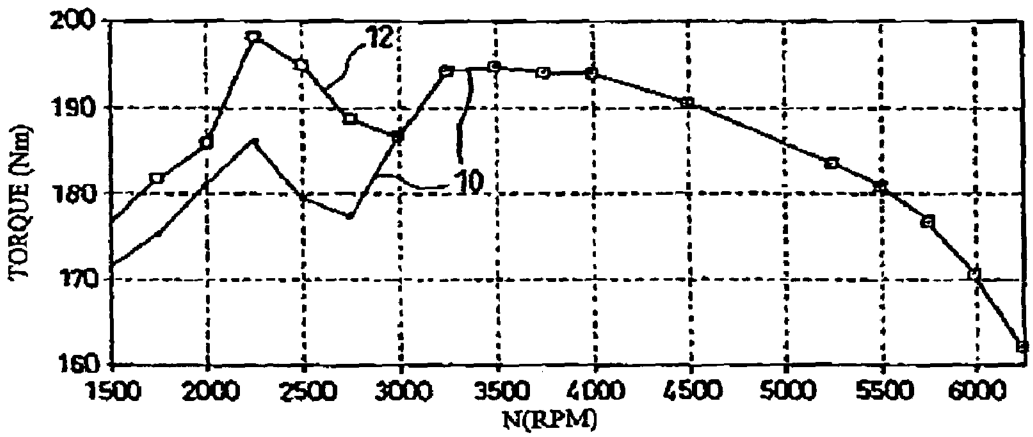
FIG. 6 shows the operating curves of an engine.

The diagram in FIG. 6 shows as an example the gains in torque at low engine speed which is brought about by the system according to the present invention in a 2-liter four-cylinder engine. Curve 10 corresponds to the torque obtained when the valves S1 and S2 close simultaneously, and curve 12 corresponds to the control of the valves S1 and S2 according to the present invention. A distinct improvement in the torque at low speed is seen.

What is claimed is:

1. Process for controlling the opening and the closing of intake valves of a cylinder of an internal combustion engine comprising a first intake valve and a second intake valve per said cylinder, exclusive of any other intake valve, the first and second intake valves permitting a first and a second intake port, respectively, of the cylinder, respectively, to be closed or opened, and being actuated cyclically in terms of opening and closing, wherein the process comprises the following steps during the closing of the first and second intake valves of the cylinder:

a first step of closing of the first intake valve, then a second step of closing of the second intake valve, at a time T after closing the first intake valve, the time, T, between the closing of the first intake valve and the closing of the second intake valve being sufficient to permit propagation toward the second valve of at least one overpressure wave generated in the first port by the closing of the first intake valve;

wherein the time, T, is at least equivalent to a time necessary for an acoustic wave to travel over a path between the first intake valve and the second intake valve, using the first and second intake ports.

2. Process in accordance with claim 1, wherein the value of the time, T, approximately equals:

$$T=(k*4*L1+L1+Lint+L2)/C0\pm\lambda L1/C0,$$

in which formula k is an integer;

L1 is a length of the first intake port;

L2 is a length of the second intake port;

Lint is a distance between inlets of the first and second intake ports located opposite the first and second intake valves, respectively;

C0 is a velocity of sound in a medium contained n the first and second intake ports; and λ is a number between 0 and 1.

3. Process for controlling the intake valves of an internal combustion engine in accordance with claim 2, wherein k has a value of 1, 2 or 3.

4. Process in accordance with claim 1, wherein the closing of the first intake valve is actuated close to a mid-course of a piston in the cylinder after top dead cent (TDC).

5. Process in accordance with claim 4, wherein the openings of the first and second intake valves are actuated approximately simultaneously.

6. Process in accordance with claim 4, characterized in that the openings of the first and second intake valves are triggered approximately at the top dead center (TDC) during operation of the engine.

7. System for controlling the opening and closing of intake valves of a cylinder of an internal combustion engine comprising first and second intake valves per said cylinder, exclusive of any other intake valve, the first and second intake valves being actuated cyclically by actuating devices to close or open first and second intake ports of the cylinder, respectively, wherein the system comprises a central control unit that controls the actuating devices in terms of the closing of the first and second intake valves in such a way as to actuate the closing of the first intake valve and, then, a time, T, after the closing of the first intake valve, the closing of the second intake valve;

wherein the time, T, is at least equivalent to a time necessary for an acoustic wave to travel over a path between the first intake valve and the second intake valve using the first and second intake ports.

8. System in accordance with claim 7, wherein the time, T, is sufficient to permit propagation toward the intake second valve of at least one overpressure wave generated in the first port by the closing of the first intake valve.

9. System in accordance with claim 7, wherein the value of the time, T, is approximately $$T=(k*4*L1+L1+L\text{int}+L2)/C0\pm\lambda L1/C0,$$

in which formula k is an integer,

L1 is a length of the first intake port;

L2 is a length of the second intake port;

Lint is a distance between inlets of the first and second intake ports located opposite the first and second intake valves, respectively, and C0 is a velocity of sound in a medium contained n the first and second intake ports, and λ is a number between 0 and 1.

10. System in accordance with claim 9, wherein k has a value of 1, 2 or 3.

11. System in accordance with claim 8, wherein a central control unit controls the closing of the first intake valve close to a mid-course of a piston in the cylinder after top dead center (TDC).

12. System in accordance with claim 11, wherein the central control unit controls actuating devices in such a way as to achieve the openings of the first and second intake valves approximately simultaneously.

13. System in accordance with claim 12, wherein the central control unit controls the actuating devices in such a way that the openings of the first and second intake valves take place approximately at the top dead center during operation of the engine.

14. System in accordance with claim 7, wherein the actuating devices are electromagnetic or electromechanical actuating devices.

* * * * *